United States Patent
Sebastian et al.

(10) Patent No.: US 9,557,184 B2
(45) Date of Patent: Jan. 31, 2017

(54) ELECTRONIC SYSTEM WITH PREDICTION MECHANISM AND METHOD OF OPERATION THEREOF

(71) Applicant: Telenav, Inc., Sunnyvale, CA (US)

(72) Inventors: Jose Sebastian, Mountain View, CA (US); Aliasgar Mumtaz Husain, Milpitas, CA (US)

(73) Assignee: Telenav, Inc., Santa Clara, CA (US)

(*) Notice: Subject to any disclaimer, the term of this patent is extended or adjusted under 35 U.S.C. 154(b) by 81 days.

(21) Appl. No.: 14/177,872

(22) Filed: Feb. 11, 2014

(65) Prior Publication Data

US 2015/0228187 A1 Aug. 13, 2015

(51) Int. Cl.
*G08G 1/01* (2006.01)
*G01C 21/34* (2006.01)
*G08G 1/0968* (2006.01)

(52) U.S. Cl.
CPC ..... *G01C 21/3415* (2013.01); *G08G 1/096827* (2013.01); *G08G 1/096844* (2013.01); *G08G 1/096883* (2013.01)

(58) Field of Classification Search
CPC ............ G08G 1/0125; G08G 1/096827; G08G 1/096844; G08G 1/096883; G01C 21/3415
USPC ................................ 701/117, 522, 532, 533
See application file for complete search history.

(56) References Cited

U.S. PATENT DOCUMENTS

| | | | |
|---|---|---|---|
| 6,427,114 B1 | 7/2002 | Olsson | |
| 8,150,611 B2* | 4/2012 | Mukherjee | G08G 1/0104 701/117 |
| 2005/0251330 A1 | 11/2005 | Waterhouse et al. | |
| 2007/0135990 A1 | 6/2007 | Seymour et al. | |
| 2007/0208492 A1* | 9/2007 | Downs | G08G 1/0104 701/117 |
| 2009/0307660 A1 | 12/2009 | Srinivasan | |
| 2011/0098915 A1* | 4/2011 | Disatnik et al. | 701/201 |

* cited by examiner

*Primary Examiner* — Brian P Sweeney
(74) *Attorney, Agent, or Firm* — IP Investment Law Group

(57) ABSTRACT

An electronic system includes: a communication unit for providing a factor; a storage unit, coupled to the communication unit, for consolidating history with the factor; a control unit, coupled to the storage unit, for: estimating a delay based on the factor and the history; predicting traffic based on the estimated delay; and determining an alternate route based on the predicted traffic.

20 Claims, 5 Drawing Sheets

_(1)_

ELECTRONIC SYSTEM WITH PREDICTION MECHANISM AND METHOD OF OPERATION THEREOF

TECHNICAL FIELD

An embodiment of the present invention relates generally to an electronic system, and more particularly to a system for prediction.

BACKGROUND

Modern consumer and industrial electronics, especially devices such as graphical display systems, televisions, projectors, mobile phones, portable digital assistants, navigation systems, and combination devices, are providing increasing levels of functionality to support modern life including three-dimensional display services. Research and development in the existing technologies can include many different directions.

One such direction that has received limited research and development is traffic. Little has been done to provide improved, much less enhanced, traffic information. Currently, while traffic information is available, such traffic information generally only describes the condition of a certain traffic route at the present.

Current traffic prediction systems provide an estimate of the traffic scenario along a route that is valid only at the beginning of a navigation session. This estimate may be updated as the navigation session progresses. Further these estimates are based on a limited number of data sources, like historical data, live data from users, or sensors.

Present congestion is provided primarily by traffic sensors. Future congestion is largely predicted based on present congestion, historical trends, etc. Such predictions are inherently uncertain. The effectiveness of traffic management systems would be increased by the availability of reliable predictions of the future location of commuter vehicles on the roadway.

Methodologies exist to measure or predict the traffic flow as a car moves along a particular roadway. However, such methodologies rely on long-term historical data, which is not a good predictor of future traffic flow, or are one dimensional in predicting traffic flow as a function of arrival time at a certain point. There remains a need to accurately predict road capacity at future intervals as a function of not only time, but other parameters as well.

Thus, a need still remains for an electronic system with prediction mechanism to estimate time. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including: a communication unit for providing a factor; a storage unit, coupled to the communication unit, for consolidating history with the factor; a control unit, coupled to the storage unit, for: estimating a delay based on the factor and the history; predicting traffic based on the estimated delay; and determining an alternate route based on the predicted traffic.

An embodiment of the present invention provides a method of operation of an electronic system including: providing a factor; consolidating history with the factor; estimating, with a control unit, a delay based on the factor and the history; predicting traffic based on the estimated delay; and determining an alternate route based on the predicted traffic.

An embodiment of the present invention provides a non-transitory computer readable medium including stored thereon instructions to be executed by a control unit including: providing a factor; consolidating history with the factor; estimating a delay based on the factor and the history; predicting traffic based on the estimated delay; and determining an alternate route based on the predicted traffic.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
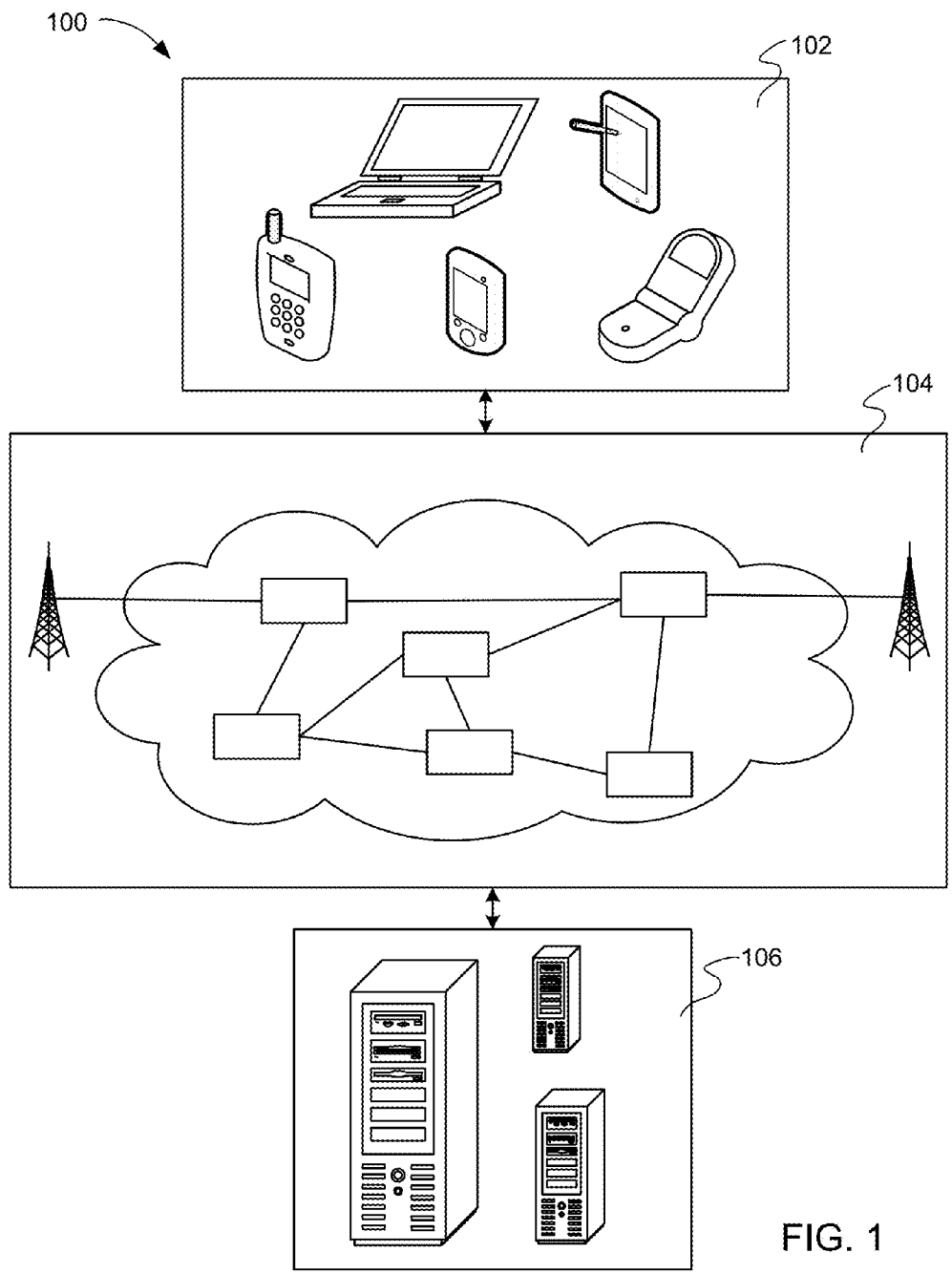
FIG. 1 is an electronic system with prediction mechanism in an exemplary embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "image" referred to herein can include a two-dimensional image, three-dimensional image, video frame, a computer file representation, an image from a camera, a video frame, or a combination thereof. For example, the image can be a machine readable digital file, a physical photograph, a digital photograph, a motion picture frame, a video frame, an x-ray image, a scanned image, or a combination thereof.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an electronic system 100 with prediction mechanism in an exemplary embodiment of the present invention. The electronic system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, a notebook computer, a liquid crystal display (LCD) system, a light emitting diode (LED) system, or other multi-functional display or entertainment device. The first device 102 can couple, either directly or indirectly, to the communication path 104 to communicate with the second device 106 or can be a stand-alone device.

For illustrative purposes, the electronic system 100 is described with the first device 102 as a display device, although it is understood that the first device 102 can be different types of devices. For example, the first device 102 can also be a device for presenting images or a multi-media presentation. A multi-media presentation can be a presentation including sound, a sequence of streaming images or a video feed, or a combination thereof. As an example, the first device 102 can be a high definition television, a three dimensional television, a computer monitor, a personal digital assistant, a cellular phone, or a multi-media set.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the electronic system 100 is described with the second device 106 as a computing device, although it is understood that the second device 106 can be different types of devices. Also for illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
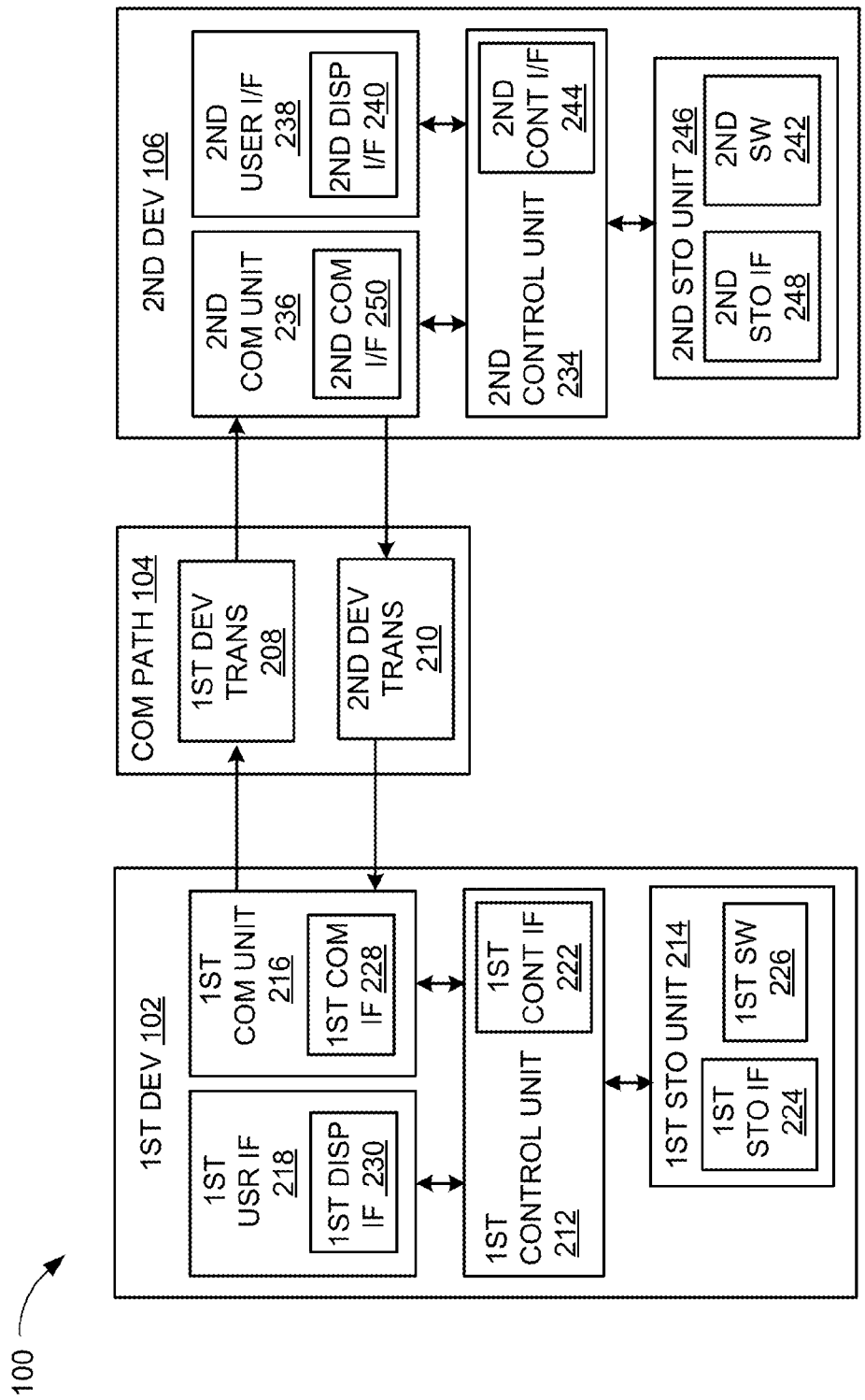
FIG. 2 is an exemplary block diagram of the electronic system.

Referring now to FIG. 2, therein is shown an exemplary block diagram of the electronic system 100. The electronic system 100 can include the first device 102, the communication path 104, and the second device 106. The first device 102 can send information in a first device transmission 208 over the communication path 104 to the second device 106. The second device 106 can send information in a second device transmission 210 over the communication path 104 to the first device 102.

For illustrative purposes, the electronic system 100 is shown with the first device 102 as a client device, although it is understood that the electronic system 100 can have the first device 102 as a different type of device. For example, the first device 102 can be a server having a display interface.

Also for illustrative purposes, the electronic system 100 is shown with the second device 106 as a server, although it is understood that the electronic system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the electronic system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment, such as a peripheral device or a computer desktop, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include a display, a projector, a video screen, a speaker, or any combination thereof.

The first control unit 212 can operate the first user interface 218 to display information generated by the electronic system 100. The first control unit 212 can also execute the first software 226 for the other functions of the electronic system 100. The first control unit 212 can further execute the first software 226 for interaction with the communication path 104 via the first communication unit 216.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, and a second user interface 238.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the electronic system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the electronic system 100, including operating the second communication unit 236 to communicate with the first device 102 over the communication path 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second controller interface 244. The second controller interface 244 can be used for communication between the second control unit 234 and other functional units in the second device 106. The second controller interface 244 can also be used for communication that is external to the second device 106.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the electronic system 100 is shown with the second storage unit 246 as a single hierarchy storage system, although it is understood that the electronic system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 106. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication path 104 to send information to the second device 106 in the first device transmission 208. The second device 106 can receive information in the second communication unit 236 from the first device transmission 208 of the communication path 104.

The second communication unit 236 can couple with the communication path 104 to send information to the first device 102 in the second device transmission 210. The first device 102 can receive information in the first communication unit 216 from the second device transmission 210 of the communication path 104. The electronic system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100.

The modules described in this application can be implemented as instructions stored on a non-transitory computer readable medium to be executed by a first control unit 212, the second control unit 234, or a combination thereof. The non-transitory computer medium can include the first storage unit 214, the second storage unit 246, or a combination thereof. The non-transitory computer readable medium can include non-volatile memory, such as a hard disk drive (HDD), non-volatile random access memory (NVRAM), solid-state storage device (SSD), compact disk (CD), digital video disk (DVD), universal serial bus (USB) flash memory devices, Blu-ray Disc™, any other computer readable media, or combination thereof. The non-transitory computer readable medium can be integrated as a part of the electronic system 100 or installed as a removable portion of the electronic system 100.

The modules described in this application can be part of the first software 226, the second software 242, or a combination thereof. These modules can also be stored in the first storage unit 214, the second storage unit 246, or a combination thereof. The first control unit 212, the second control unit 234, or a combination thereof can execute these modules for operating the electronic system 100.

The modules described in this application can be hardware implementation, hardware circuitry, or hardware accelerators in the first control unit 212 or in the second control unit 234. The modules can also be hardware implementation, hardware circuitry, or hardware accelerators within the first device 102 or the second device 106 but outside of the first control unit 212 or the second control unit 234, respectively.

Figure 3:
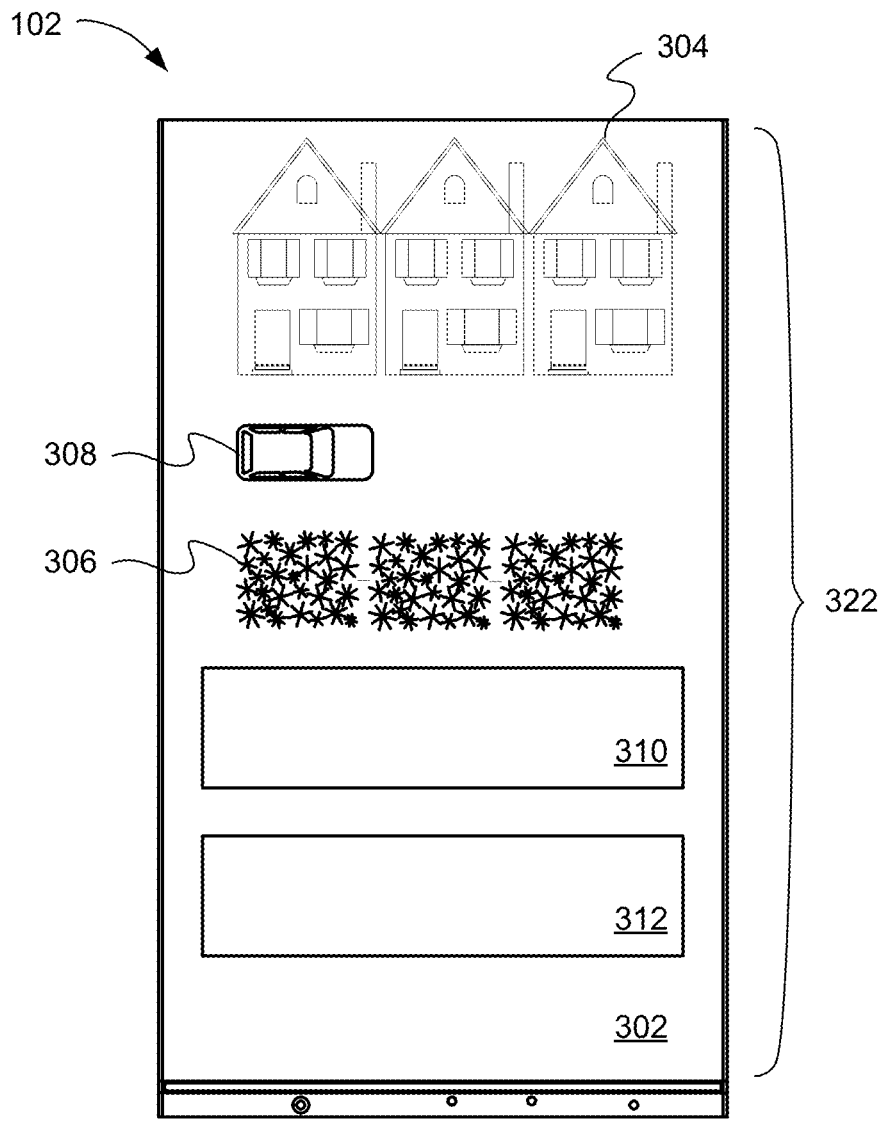
FIG. 3 is an example of a display interface of the electronic system.

Referring now to FIG. 3, therein is shown an example of a display interface 302 of the electronic system 100. The electronic system 100 can include the first device 102 of FIG. 1 or the second device 106 of FIG. 1 with the display interface 302, such as the first display interface 230 of FIG. 2 or the second display interface 240 of FIG. 2. The display interface 302 can provide a graphical interface with images for locations and objects.

For example, the display interface 302 can include an image of a structure 304, such as a building on a navigation route. The structure 304 can be displayed adjacent an image of a geographic feature 306, such as plants on the navigation route. An image of a vehicle 308, such as an automobile on the navigation route, can also be displayed as it is positioned with respect to the structure 304 and the geographic feature 306.

The display interface 302 can also display prediction information 310 based on a specific route segment at a time of travel when the user is scheduled to navigate through that particular route segment. Updates for the navigation route as well as possible alternate routes 312 can be displayed dynamically based on the prediction information. Further an estimated time of arrival can be re-estimated for updated navigation routes or for the alternate routes 312 and displayed on the display interface 302. A user can be provided options, such as the alternate routes 312, displayed on the display interface 302 to be chosen while on the navigation route.

The display interface 302 provides a physical transformation from the image of the vehicle 308 resulting in movement in the physical word, such as a user vehicle traveling on the navigation route. Movement in the physical world results in changes to the image of the vehicle 308, the image of the structure 304, and the image of the geographic feature 306, by travel on the navigation route.

For illustrative purposes the display interface 302 is shown with a screen image 322 with the vehicle 308, the structure 304, the prediction information 310, and the alternate routes 312, although it is understood that any combination or configuration of the images and any number of the screen images 322 may be used. Multiple of the screen image 322 of the display interface 302 can be displayed such as by scrolling, refreshing, splitting, overlaying, superimposing, picture-in-picture, otherwise changing, or combination thereof, of the display interface 302

It has been discovered that the electronic system 100 with the display interface 302 can display images of the navigation route such as the image of the vehicle 308, the image of the structure 304, the image of the geographic feature 306, the prediction information 310, the alternate routes 312, or combination thereof. A single screen image or multiple screen images may be used to display images and information for the navigation route.

Figure 4:
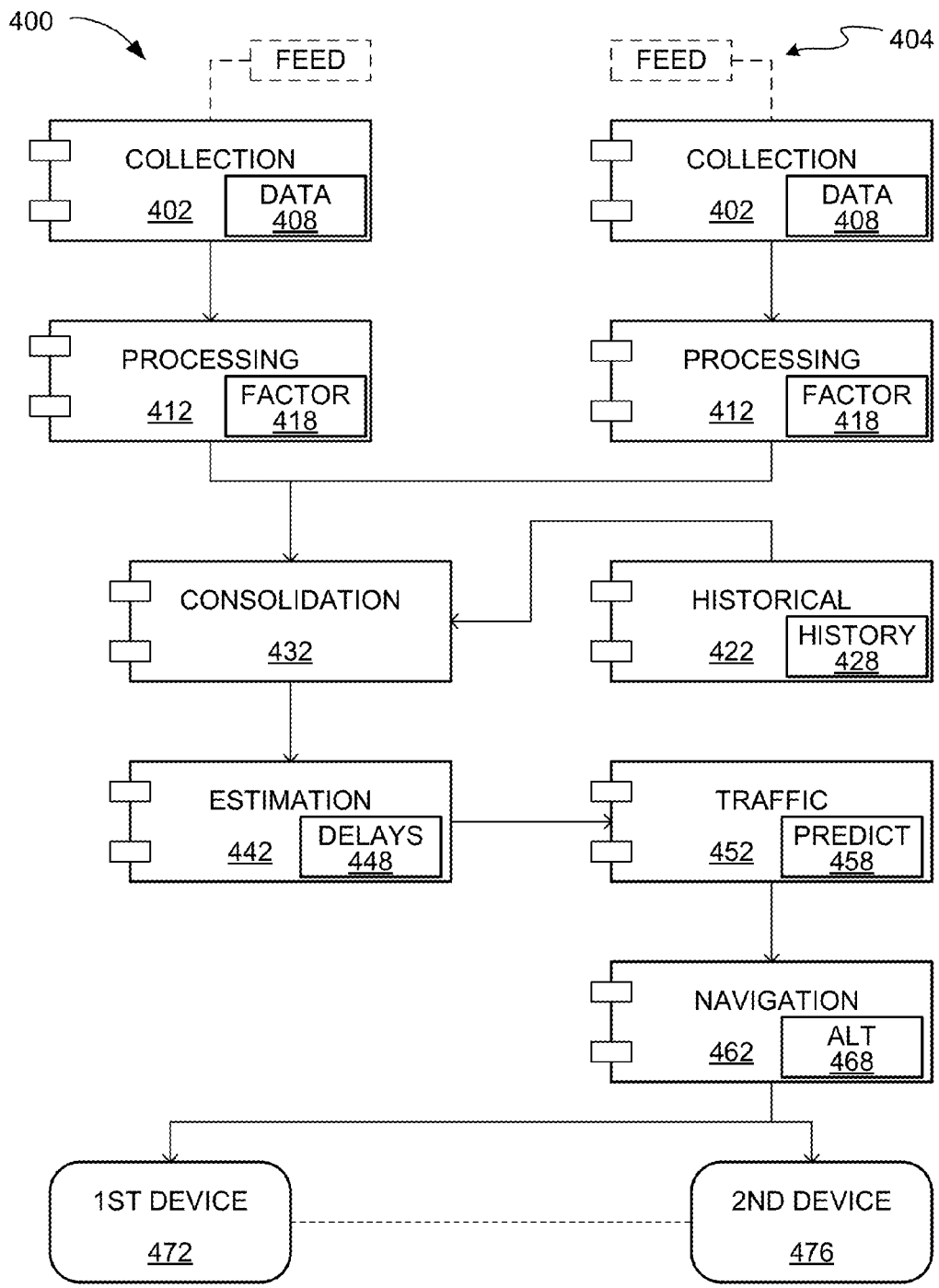
FIG. 4 is a control flow of the electronic system in an exemplary embodiment.

Referring now to FIG. 4, therein is shown a control flow 400 of the electronic system 100 in an exemplary embodiment. The electronic system 100 can include collection modules 402 such as feed collectors for a feed 404 providing feed data 408, processing modules 412 such as feed processors for factors 418, a historical module 422 such as a historical data provider for history 428, a consolidation module 432 such as a feed consolidator, an estimation module 442 such as a traffic estimator for estimated delays 448, a traffic module 452 such as a traffic data module for predicted traffic 458, a navigation module 462 such as a routing and navigation engine for alternative routes 468, a first device 472 such as the first device 102 of FIG. 1 including a user handheld device, and a second device 476 such the second device 106 of FIG. 1 including another user handheld device.

The electronic system 100 with prediction mechanism can provide traffic predictions such as the predicted traffic 458 on a specific route segment at a time of travel when the user is scheduled to navigate through that particular route segment that can intersect or be included in an affected bounding area. The electronic system 100 can also provide prediction of an Estimated Arrival Time or Estimated Time of Arrival (ETA) by factoring in this traffic prediction such as the predicted traffic 458. Further, the electronic system 100 can calculate, process, determine, update, provide, or combination thereof, alternate routes such as the alternative routes 468 dynamically based on traffic such as the predicted traffic 458 and ETA estimates changes. Alternate route options such as the alternative routes 468 can be chosen during a navigation session.

The prediction can include several of the factors 418, each of which can be weighted, such as by an application implementing the electronic system 100. For example, the electronic system 100 can include the factors 418 such as public events, events from a social graph, usage data, communication from a social graph with others including friends or other users, weather forecasts, traffic incident reports, amount of parking available, check-in time, check-in order, arrival number, arrival order, physical resources, the history 428 such as historical data, live feeds from sensors, peer to peer communication such as the first device 472 to the second device 476, other of the factors 418, or combination thereof. The prediction can also include time of one of the factors 418 and logical consequence of the factors 418 such as events, incidents, clearing up scenario, or combination thereof.

The factors 418 can be time-based information such as the feed data 408, continuously updated, or combination thereof, and cross-referenced with past or the history 428 such as historical data. The factors 418 can be identified by locations with a bounding area at least based on transportation access. For example, some of the factors 418 may be included for specific context-based information such as the feed data 408 including time-based events. The factors 418 can be a single event or at least infrequently occurring and have significant logical consequences but limited effect for future prediction. Other of the factors 418 may be included for ongoing changes or additions such as social connections. These other of the factors 418 can change at any time and vary in effect, logical consequence, and future prediction.

The electronic system 100 with prediction mechanism collects a variety of data through different of feeds 404 or sources and performed by many processes. For example, the electronic system 100 could poll a provider at a preset interval, poll when a number of users changes by a preset threshold, poll based on a preset criteria, or combination thereof. Some providers can invoke a notification, such as a callback mechanism, when new data is available share. These processes can be applied to any of the feeds 404 or the factors 418.

The feed 404 can provide information such as the feed data 408 to the collection modules 402 for the factors 418 such as public events, including a game or concert, which can cause additional traffic such as the predicted traffic 458 in route segments within a bounding box. The factors 418 can include the feed data 408 such as database information, directional effects, multiple locations, multiple time frames, or combination thereof. A particular destination or any route segments that fall within the bounding box of a public event can be factored into traffic such as the predicted traffic 458 and ETA estimation. If a user is not attending this event, a faster alternate route such as the alternative routes 468 could be offered to the user.

The feed 404 can provide information such as the feed data 408 to the collection modules 402 for the factors 418 such as an event from social graphs, including a graduation such as a niece's graduation, which could cause additional traffic such as the predicted traffic 458 around a destination. Navigation through a route that is within a same bounding box could cause delays such as the estimated delays 448. If a user isn't attending the event, a faster alternate route such as the alternative routes 468 could be offered to the user. The additional traffic such as the predicted traffic 458 can be based on significance of the event, number of attendees, type of event, ages of the attendees, honoree for the event, or combination thereof.

The feed 404 can provide information such as the feed data 408 to the collection modules 402 for the factors 418 such as usage data that could indicate additional traffic such as the predicted traffic 458 in a bounding box. The system can take into account routes taken by other users and estimated times of travel for travelling through a same route segments to factor in additional delays such as the estimated delays 448. If a significant number of the other users are travelling through the same route segments or the bounding box can causes a delay such as the estimated delays 448 for all users, alternate routes such as the alternative routes 468 can be offered to some of the users particularly the users that provide route information, subscribe to a particular service, provide information between applications, or combination thereof.

The feed 404 can provide information such as the feed data 408 to the collection modules 402 for the factors 418 such as social communication that can provide anecdotal information including complaints, reasons for delays such as the estimated delays 448, questions about congestion, or combination thereof. Information about traffic congestions that can be gleaned from social communication media, when understood or interpreted can be a factor in the traffic such as the predicted traffic 458 and ETA estimation. The social communication can also be used to dynamically offer an alternate route such as the alternative routes 468 when a user is already in a navigation session.

The feed 404 can provide information such as the feed data 408 to the collection modules 402 for the factors 418 such as weather forecasts that can cause additional traffic such as the predicted traffic 458. Some weather conditions significantly impact traffic such as slowing down for fog or rain. The weather forecast can be used as a factor in estimating traffic delays, such as the estimated delays 448, and ETAs. In regions with micro-climates or for long trips, the weather forecast is particularly useful in identifying routes that pass through regions with weather conditions or chance of weather that have less impact on traffic. Alternate routes such as the alternative routes 468 can be offered to avoid weather conditions or chance of weather that have significant impact on traffic such a first snow fall, black ice due to freezing rain, black ice due to temperature fluctuations after the first snow fall, first rain, light rain, heavy rain, or combination thereof.

The feed 404 can provide information to the collection modules 402 for the factors 418 such as traffic incident reports that can cause additional traffic such as the predicted traffic 458. Live traffic reports provide information about incidents. This information about traffic incidents can be used to determine an amount of delay, such as the estimated delays 448, when travelling within a same bounding box. If a user is already in a navigation session, and a traffic incident occurs, alternate routes such as the alternative routes 468 can be provided.

The collection modules 402 can collect, receive, record, request, respond, accept, or combination thereof, data from the feed 404. The feed 404 can include any source or service such as sources or services for a public calendar, a public announcement, a social graph, usage data, communication, weather, traffic, traffic incidents, the history 428 such as historical data, amount of parking available, check-in time, check-in order, arrival number, arrival order, physical resources, live feeds from sensors, or combination thereof.

The collection modules 402 can be implemented by the first communication unit 216, the second communication unit 236, the first storage unit 214, the second storage unit 246, the first user interface 218 of FIG. 2, the second user interface 238 of FIG. 2, the first control unit 212 of FIG. 2, the second control unit 234 of FIG. 2, or combination thereof.

The collection modules 402 can be coupled to the processing modules 412, the consolidation module 432, the historical module 422, the estimation module 442, the traffic module 452, the navigation module 462, the first device 472, the second device 476, or combination thereof.

The processing modules 412 can process the factors 418 based on feed data 408 to retrieve, generate, retain, or combination thereof, information that is useful to the electronic system 100. For example, data about public events can be processed to retrieve date of an event, time of the event, and location of the event. Further processing can be done to generate a bounding box around the location of the event and list the roads or route segments within the bounding box.

The processing modules 412 can be implemented by the first control unit 212, the second control unit 234, the first storage unit 214, the second storage unit 246, the first communication unit 216, the second communication unit 236, or combination thereof.

The processing modules 412 can be coupled to the collection modules 402, the consolidation module 432, the historical module 422, the estimation module 442, the traffic module 452, the navigation module 462, the first device 472, the second device 476, or combination thereof.

The historical module 422 can provide the history 428 such as historical data of the factors 418 such as public events, events from a social graph, usage data, communication from a social graph with others including friends or other users, weather forecasts, traffic, traffic incident reports, the history 428 such as historical data, amount of parking available, check-in time, check-in order, arrival number, arrival order, physical resources, live feeds from sensors, other of the factors 418, or combination thereof.

The historical module 422 can be implemented by the first storage unit 214, the second storage unit 246, the first control unit 212, the second control unit 234, the first communication unit 216, the second communication unit 236, the first user interface 218, the second user interface 238, or combination thereof.

The historical module 422 can be coupled to the collection modules 402, the processing modules 412, the consolidation module 432, the estimation module 442, the traffic module 452, the navigation module 462, the first device 472, the second device 476, or combination thereof.

The consolidation module 432 can consolidate the factors 418 such as processed data based on the feed data 408 from different of the feeds 404. During a consolidation phase, a weighted value can be assigned to data such as the feed data 408 or the factors 418 based on preset criteria. For example, public events such as a game can have a larger impact on traffic such as the predicted traffic 458 around a stadium than a friend's birthday party at club. Consolidated data including the factors 418 can be combined with the history 428 such as historical data that can also be assigned a weight weighted value for the estimation module 442.

The consolidation module 432 can be implemented by the first storage unit 214, the second storage unit 246, the first control unit 212, the second control unit 234, the first communication unit 216, the second communication unit 236, or combination thereof.

The consolidation module 432 can be coupled to the collection modules 402, the processing modules 412, the historical module 422, the estimation module 442, the traffic module 452, the navigation module 462, the first device 472, the second device 476, or combination thereof.

The estimation module 442 can calculate a delay, such as the estimated delays 448, for each segment of a map or route. Additionally, it estimates a delay, such as the estimated delays 448, in each segment for a specific period of time such as time of travel. An estimation of traffic with delays, such as the estimated delays 448, can be provided to the traffic module 452.

The estimation module 442 can be implemented by the first storage unit 214, the second storage unit 246, the first control unit 212, the second control unit 234, the first communication unit 216, the second communication unit 236, or combination thereof.

The estimation module 442 can be coupled to the collection modules 402, the processing modules 412, the consolidation module 432, the historical module 422, the traffic module 452, the navigation module 462, the first device 472, the second device 476, or combination thereof.

The traffic module 452 can predict traffic estimates such as the predicted traffic 458 based on the estimated delays 448 from the estimation module 442 to a routing and navigation system. The traffic module 452 can predict estimates for all segments of a planned trip. The estimates for a particular route segment can be applicable at an exact time of travel through the particular route segment of the planned trip. For example, a navigation session initiated at 2.00 PM is estimated for travel through Kifer Road at 2.30 PM, any delay, such as the estimated delays 448, that is predicted to occur on Kifer Road at 2.30 PM can be provided to the navigation module 462, but not an estimate of a delay at 2.00 PM. A time-based prediction of an estimate of a delay, such as the estimated delays 448, can be more useful and accurate in an overall estimation of the planned trip.

The traffic module 452 can be implemented by the first communication unit 216, the second communication unit 236, the first user interface 218, the second user interface 238, the first storage unit 214, the second storage unit 246, or combination thereof.

The traffic module 452 can be coupled to the collection modules 402, the processing modules 412, the consolidation module 432, the historical module 422, the estimation module 442, the navigation module 462, the first device 472, the second device 476, or combination thereof.

The navigation module 462 can present a useful prediction of traffic such as the predicted traffic 458 and arrival time by predicting estimated delays such as the estimated delays 448 based on the factors 418 from several of the feeds 404 that would affect travel through a particular route segment and at a particular time such as a time of travel. Based on the prediction of traffic such as the predicted traffic 458 and arrival time, the navigation module 462 can provide routing and guidance such as calculate, process, determine, update, provide, or combination thereof, alternate routes such as the alternative routes 468. This is a significant improvement over systems that predict ETA based on information available before a navigation session begins.

The navigation module 462 can be implemented by the first user interface 218, the second user interface 238, the first storage unit 214, the second storage unit 246, the first communication unit 216, the second communication unit 236, the first control unit 212, the second control unit 234, or combination thereof.

The navigation module 462 can be coupled to the collection modules 402, the processing modules 412, the consolidation module 432, the historical module 422, the estimation module 442, the traffic module 452, the first device 472, the second device 476, or combination thereof.

The first device 472, the second device 476, or combination thereof, can provide data or information such as public events, events from a social graph, usage data, communication from a social graph with others including friends or other users, weather forecasts, traffic, traffic incident reports, amount of parking available, check-in time, check-in order, arrival number, arrival order, physical resources, the feeds 404 from sensors, other of the factors 418, or combination thereof. The first device 472, the second device 476, or combination thereof, can provide this data or information to one another, or the collection modules 402.

The first device 472, the second device 476, or combination thereof, can be coupled to one another, the collection modules 402, the processing modules 412, the consolidation module 432, the historical module 422, the estimation module 442, the traffic module 452, the navigation module 462, or combination thereof.

The modules described in this application can be implemented as instructions stored on a non-transitory computer readable medium to be executed by a first control unit 212 of FIG. 2, the second control unit 234 of FIG. 2, or a combination thereof. The non-transitory computer medium can include the first storage unit 214 of FIG. 2, the second storage unit 246 of FIG. 2, or a combination thereof. The non-transitory computer readable medium can include nonvolatile memory, such as a hard disk drive (HDD), non-volatile random access memory (NVRAM), solid-state storage device (SSD), compact disk (CD), digital video disk (DVD), universal serial bus (USB) flash memory devices, Blu-ray Disc™, any other computer readable media, or a combination thereof. The non-transitory computer readable medium can be integrated as a part of the electronic system 100 or installed as a removable portion of the electronic system 100.

The modules described in this application can be part of the first software 226 of FIG. 2, the second software 242 of FIG. 2, or a combination thereof. These modules can also be stored in the first storage unit 214 of FIG. 2, the second storage unit 246 of FIG. 2, or a combination thereof. The first control unit 212, the second control unit 234, or a combination thereof can execute these modules for operating the electronic system 100.

The electronic system 100 has been described with module functions or order as an example. The electronic system 100 can partition the modules differently or order the modules differently. For example, the processing modules 412 can include the collection modules 402 and the consolidation module 432 as separate modules although these modules can be combined into one. Also, the estimation module 442 can be split into separate modules for implementing in the separate modules estimation based on input from the processing modules 412 and estimation based on the input from the traffic module 452.

The modules described in this application can be hardware implementation, hardware circuitry, or hardware accelerators in the first control unit 212 of FIG. 2 or in the second control unit 234 of FIG. 2. The modules can also be hardware implementation, hardware circuitry, or hardware accelerators within the first device 102 or the second device 106 but outside of the first control unit 212 or the second control unit 234, respectively.

The electronic system 100 has been described with module functions or order as an example. The electronic system 100 can partition the modules differently or order the modules differently. For example, the estimation module 442 can provide delay information, such as the estimated delays 448, directly to the navigation module 462. Further for example, the traffic module 452 can provide information directly to the estimation module 442. Further for example, the first device 472, the second device 476, or combination thereof, can provide data or information directly with one another or with the collection modules 402, the processing modules 412, the consolidation module 432, the historical module 422, the estimation module 442, the traffic module 452, the navigation module 462, the first device 472, the second device 476, or combination thereof.

The modules described in this application can be hardware implementation or hardware accelerators in the first control unit 212 of FIG. 2 or in the second control unit 234 of FIG. 2. The modules can also be hardware implementation or hardware accelerators within the first device 102 or the second device 106 but outside of the first control unit 212 or the second control unit 234, respectively.

It has been discovered that the electronic system 100 with the collection modules 402, the processing modules 412, the historical module 422, the consolidation module 432, the estimation module 442, the traffic module 452, the navigation module 462, or combination thereof, provides accurate estimated time of arrival for longer drives. An accurate estimation remains valid, throughout the navigation session to predict the estimated arrival time based on data received through several of the feeds 404.

Figure 5:
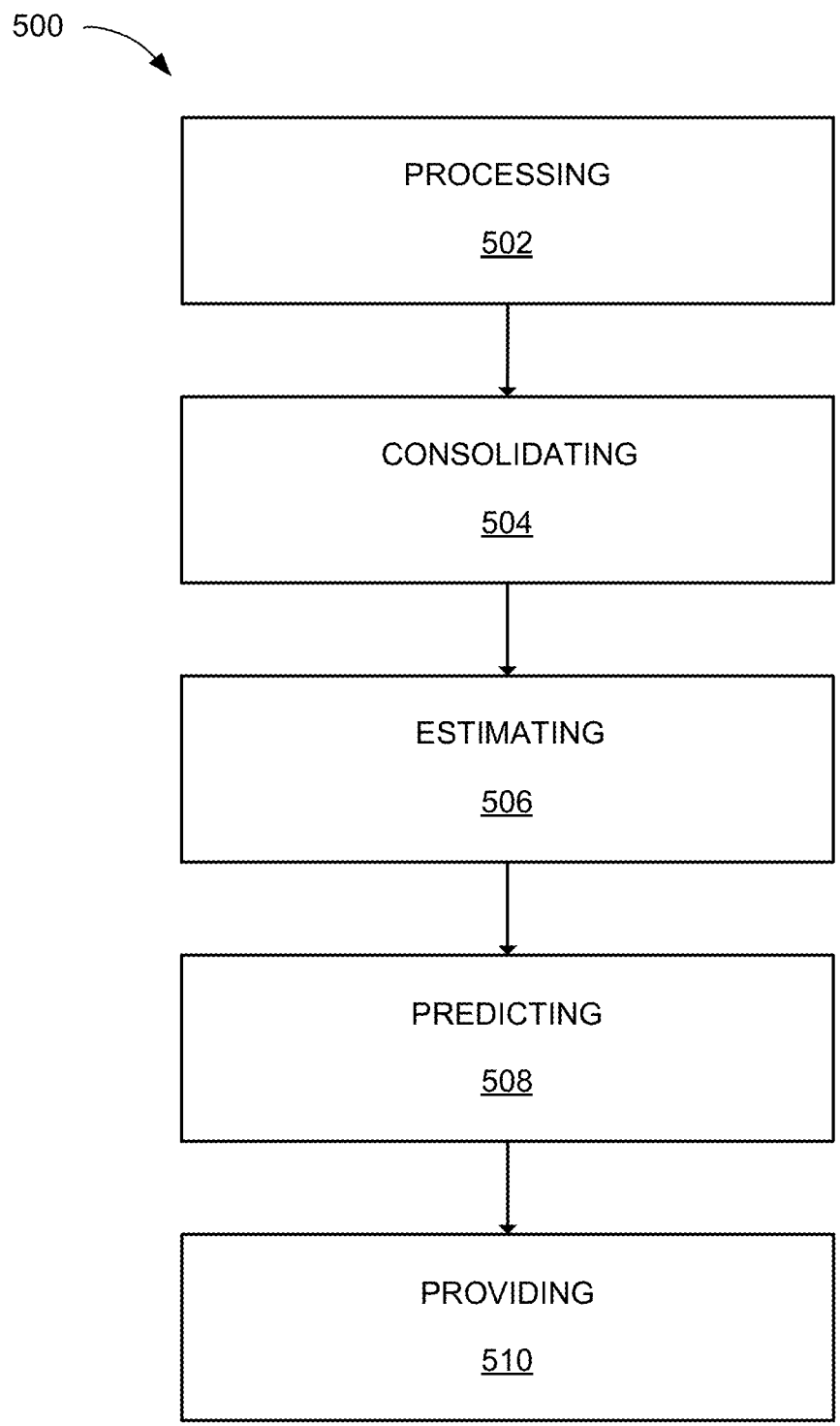
FIG. 5 is a flow chart of a method of operation of an electronic system in an embodiment of the present invention.

Referring now to FIG. 5, therein is shown a flow chart of a method 500 of operation of an electronic system 100 in an embodiment of the present invention. The method 500 includes: processing a factor in a block 502; consolidating history with the factor in a block 504; estimating, with a control unit, a delay based on the factor and the history in a block 506; predicting traffic based on the estimated delays in a block 508; and providing an alternative route based on the predicted traffic in a block 510.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
a communication unit for providing a factor;
a storage unit, coupled to the communication unit, for consolidating history with the factor;
a control unit, coupled to the storage unit, for:
estimating a delay based on the factor including a weather condition for a region with micro-climates and the history of the weather condition;
predicting traffic based on the estimated delay;
determining an alternate route based on the predicted traffic for avoiding the region impacted by the micro-climates; and
a display interface, coupled to the control unit, for displaying prediction information.

2. The system as claimed in claim 1 wherein the control unit is for predicting the traffic at a time of travel.

3. The system as claimed in claim 1 wherein the control unit is for estimating the delay for a segment of a route.

4. The system as claimed in claim 1 wherein the storage unit is for weighting the factor.

5. The system as claimed in claim 1 further comprising a user interface, coupled to the control unit, for displaying multiple screen images.

6. The system as claimed in claim 1 further comprising a user interface, coupled to the control unit, for displaying the alternate route based on the predicted traffic.

7. The system as claimed in claim 1 wherein the communication unit includes collecting feed data.

8. A method of operation of an electronic system comprising:
providing a factor;
consolidating history with the factor;
estimating, with a control unit, a delay based on the factor including a weather condition for a region with micro-climates and the history of the weather condition;
predicting traffic based on the estimated delay;

determining an alternate route based on the predicted traffic for avoiding the region impacted by the micro-climates; and displaying prediction information, with a display interface coupled to the control unit.

9. The method as claimed in claim 8 wherein predicting the traffic includes predicting the traffic at a time of travel.

10. The method as claimed in claim 8 wherein estimating the delay includes estimating the delay for a segment of a route.

11. The method as claimed in claim 8 wherein consolidating the history with the factor includes weighting the factor.

12. The method as claimed in claim 8 further comprising displaying multiple screen images.

13. The method as claimed in claim 8 further comprising displaying the alternate route based on the predicted traffic.

14. The method as claimed in claim 8 further comprising collecting feed data.

15. A non-transitory computer readable medium including stored thereon instructions to be executed by a control unit comprising:

providing a factor;

consolidating history with the factor;

estimating a delay based on the factor including a weather condition for a region with micro-climates and the history of the weather condition;

predicting traffic based on the estimated delay;

determining an alternate route based on the predicted traffic for avoiding the region impacted by the micro-climates; and displaying prediction information, with a display interface.

16. The medium as claimed in claim 15 wherein predicting the traffic includes predicting the traffic at a time of travel.

17. The medium as claimed in claim 15 wherein estimating the delay includes estimating the delay for a segment of a route.

18. The medium as claimed in claim 15 wherein consolidating the history with the factor includes weighting the factor.

19. The medium as claimed in claim 15 further comprising displaying multiple screen images.

20. The medium as claimed in claim 15 further comprising displaying the alternate route based on the predicted traffic.

* * * * *